(12) United States Patent
Sights et al.

(10) Patent No.: US 10,780,914 B2
(45) Date of Patent: Sep. 22, 2020

(54) STEERING INSTABILITY DETECTION

(71) Applicant: Trimble Inc., Sunnyvale, CA (US)

(72) Inventors: Brandon Sights, San Marcos, CA (US); Justin Creaby, Westminster, CO (US)

(73) Assignee: Trimble Inc., Sunnyvale, CA (US)

( * ) Notice: Subject to any disclaimer, the term of this patent is extended or adjusted under 35 U.S.C. 154(b) by 29 days.

(21) Appl. No.: 16/140,830

(22) Filed: Sep. 25, 2018

(65) Prior Publication Data

US 2020/0094874 A1  Mar. 26, 2020

(51) Int. Cl.

| B62D 6/04 | (2006.01) |
| B60W 50/00 | (2006.01) |
| B62D 15/02 | (2006.01) |
| A01B 69/00 | (2006.01) |
| A01B 76/00 | (2006.01) |
| G05D 1/00 | (2006.01) |

(52) U.S. Cl.
CPC .............. *B62D 6/04* (2013.01); *B60W 50/00* (2013.01); *B62D 15/021* (2013.01); *A01B 69/00* (2013.01); *A01B 76/00* (2013.01); *B60W 2050/0054* (2013.01); *B60W 2050/0055* (2013.01); *B60W 2050/0056* (2013.01); *G05D 1/0055* (2013.01)

(58) Field of Classification Search
CPC .. B60W 2540/18; A01B 69/008; A01B 69/00; B62D 6/00; B62D 6/02; B62D 6/008; B62D 5/0472
See application file for complete search history.

(56) References Cited

U.S. PATENT DOCUMENTS

| 2014/0074340 | A1 | 3/2014 | Wilson et al. |
| 2016/0318548 | A1* | 11/2016 | Tsubaki ............... B62D 5/0472 |
| 2018/0086371 | A1 | 3/2018 | Wang et al. |
| 2018/0281848 | A1* | 10/2018 | Zegelaar ............ B62D 15/0255 |
| 2018/0346016 | A1* | 12/2018 | Otto ...................... B62D 5/0481 |

(Continued)

FOREIGN PATENT DOCUMENTS

| DE | 101 19 907 A1 | 10/2002 |
| EP | 2 821 319 A1 | 1/2015 |
| WO | 02/100704 A2 | 12/2002 |

OTHER PUBLICATIONS

International Search Report and Written Opinion for Application No. PCT/US2019/051291, dated Jan. 3, 2020, 13 pages.

*Primary Examiner* — Kenneth J Malkowski
(74) *Attorney, Agent, or Firm* — Kilpatrick Townsend & Stockton LLP

(57) ABSTRACT

A method of detecting steering wheel angle instability in an auto-guided vehicle includes measuring a steering wheel angle at a plurality of time instances within a pre-determined time window to obtain an array of values of the steering wheel angle, performing a frequency analysis of the array of values of the steering wheel angle to obtain a frequency spectrum of the steering wheel angle, comparing the frequency spectrum of the steering wheel angle to a pre-defined threshold frequency spectrum to determine whether a magnitude of the frequency spectrum of the steering wheel angle at any frequency exceeds a magnitude of the threshold frequency spectrum, and upon determining that a magnitude of the frequency spectrum of the steering wheel angle at one or more frequencies exceeds a magnitude of the pre-defined threshold frequency spectrum, determining that a steering wheel angle instability is present.

20 Claims, 11 Drawing Sheets

(56) References Cited

U.S. PATENT DOCUMENTS

2019/0126981 A1* 5/2019 Goering .................. B62D 6/00
2019/0315397 A1* 10/2019 Weigl ..................... B62D 7/222
2020/0001912 A1* 1/2020 Abuaita ................. B62D 1/181

* cited by examiner

STEERING INSTABILITY DETECTION

BACKGROUND

In operating an agricultural vehicle such as a tractor or a harvester, it is often desirable for the vehicle to follow a pre-planned path over an area, for example when planting a field. Deviating from the pre-planned path may result in damaged crops, overplanting, reduced yield per acre, and the like. Following pre-planned paths may also be desirable for other types of vehicles and operations, such as road side spraying, road salting, and snow plowing.

Automatic guidance systems are increasingly used for controlling agricultural vehicles and environmental management vehicles where following a previously defined route is desirable. This allows more precise control of the vehicles than is typically realized than if the vehicle is steered by a human operator. Systems of course-correction may be used to minimize cross-track and offset if the vehicle deviates from a pre-planned path. For example, an automatic steering system may command a steering wheel angle in order for the vehicle to follow the pre-planned path. In some cases, the steering control system may go unstable for a variety of reasons such as incorrect configurations, changes in external conditions or changes in the physical system. Therefore, there is a need to detect instabilities in an automatic steering system.

SUMMARY

According to some embodiments, a method of detecting steering wheel angle instability in an auto-guided vehicle includes measuring a steering wheel angle at a plurality of time instances within a pre-determined time window to obtain an array of values of the steering wheel angle at the plurality of time instances. Each respective value of the array of values corresponds to a respective time instance of the plurality of time instances. The method further includes performing a frequency analysis of the array of values of the steering wheel angle to obtain a frequency spectrum of the steering wheel angle, and comparing the frequency spectrum of the steering wheel angle to a pre-defined threshold frequency spectrum to determine whether a magnitude of the frequency spectrum of the steering wheel angle at any frequency exceeds a magnitude of the threshold frequency spectrum at a corresponding frequency. The method further includes, upon determining that a magnitude of the frequency spectrum of the steering wheel angle at one or more frequencies exceeds a magnitude of the pre-defined threshold frequency spectrum at the one or more frequencies, determining that a steering wheel angle instability is present.

According to some other embodiments, a system for detecting steering wheel angle instability in an auto-guided vehicle includes a steering wheel angle sensor coupled to a steering wheel of the vehicle. The steering wheel angle sensor is configured to measure a steering wheel angle at a plurality of time instances within a pre-determined time window to obtain an array of values of the steering wheel angle at the plurality of time instances. Each respective value of the array of values corresponds to a respective time instance of the plurality of time instances. The system further includes a memory for storing the array of values of the steering wheel angle, and a processor coupled to the memory. The processor is configured to perform a frequency analysis of the array of values of the steering wheel angle to obtain a frequency spectrum of the steering wheel angle, and compare the frequency spectrum of the steering wheel angle to a pre-defined threshold frequency spectrum. The processor is further configured to set an instability flag upon determining that a magnitude of the frequency spectrum of the steering wheel angle at one or more frequencies exceeds a magnitude of the threshold frequency spectrum at the one or more frequencies.

DETAILED DESCRIPTION

Figure 1:
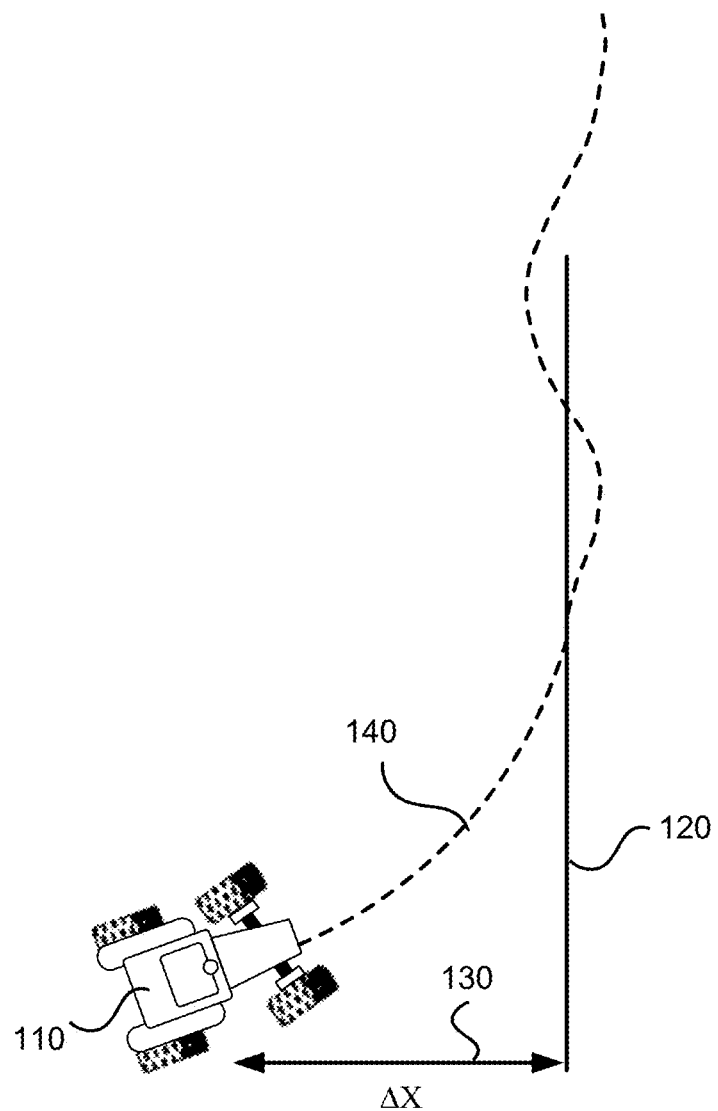
FIG. 1 illustrates cross-track errors of a vehicle from a pre-planned path.

An auto-guidance or automatic steering system for a vehicle may determine the geographic position of the vehicle and determine whether the vehicle is traveling in a desired direction. If the vehicle is not traveling in a desired direction, the automatic steering system may determine a course correction for the vehicle and generate a steering command to implement the course correction. For instance, in the example illustrated in FIG. 1, the current position of the vehicle 110 deviates from the pre-planned path 120 to the left by a cross-track error ΔX 130. An automatic steering system may generate a steering command based on the deviation and a current heading of the vehicle 110, so that the vehicle's traveling path 140 may be corrected toward the pre-planned path 120. For the purposes of the present invention, the term "vehicle" may refer to any types of vehicles or mobile machines, which may include agricultural vehicles such as tractors, harvesters, and the like, environmental management vehicles such as road side spraying vehicles, snow plowing vehicles, and the like, as well as other types of vehicles.

An automatic steering system may include a control loop feedback mechanism for providing continuously modulated control based on measured errors. Examples of a control loop feedback mechanism may include a proportional-integral-derivative controller (also referred to as a PID controller or a three term controller). A PID controller may be configured to continuously calculate an error value e(t) as the difference between a desired setpoint (SP) and a measured process variable (PV) and apply a correction based on proportional, integral, and derivative terms. Tuning a control loop is the process of adjusting the control parameters (e.g., proportional gain or pGain, integral gain or iGain, derivative gain or dGain) to the optimum values for the desired control response.

Figure 2:
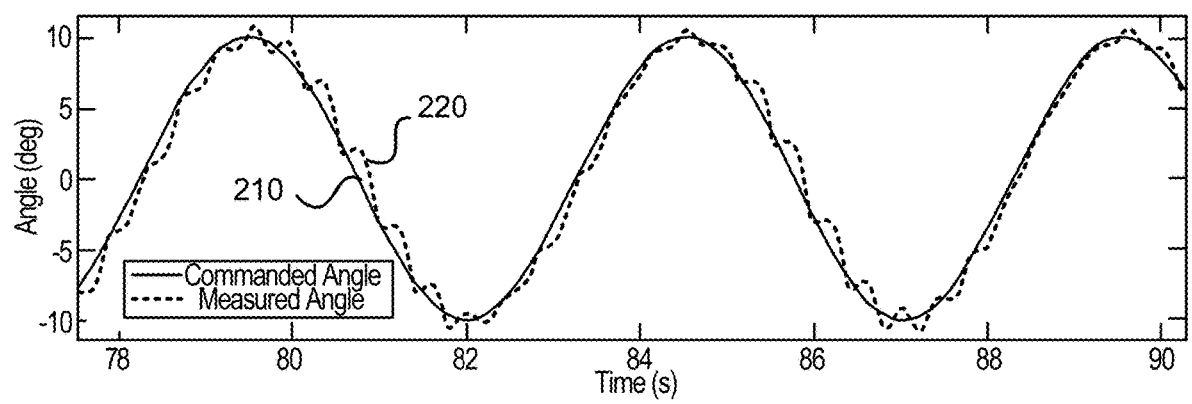
FIG. 2 shows an exemplary plot of the commanded steering wheel angles as a function of time (solid line) and an exemplary plot of the measured steering wheel angles as a function of time (dashed line).

In some situations, a measured steering wheel angle may differ from a commanded steering wheel angle. Such situations may be caused, for example, by instability of an automatic steering system or by the commanded steering wheel angle being outside of the automatic steering system's bandwidth. For instance, consider the example illustrated in FIG. 2, where the solid line 210 is a plot of the commanded steering wheel angles as a function of time, and the dashed line 220 is a plot of the measured steering wheel angles as a function of time. As illustrated, the commanded steering wheel angles follow approximately a sinusoidal curve as a function of time with certain frequency, and the measured steering wheel angles exhibit an additional higher frequency component that is not commanded. The presence of such additional frequency component can be one manifestation of an instability. The frequency (or frequencies) of the additional frequency component(s) can be either higher or lower than the frequency of the commanded steering wheel angles. It should be noted that the steering command illustrated in FIG. 2 is an artificially created steering command for illustration purposes, and may not represent normal steering.

The instability may be a result of a controller gain being too high. During servo tuning of an automatic steering system, it may be useful for an operator to be aware that there is an instability so the operator may reduce a control gain (e.g., the pGain, the iGain, or the dGain). Alternatively, in an auto-tuning routine, a control gain may be automatically reduced when an instability is detected. Embodiments of the present invention provide methods and systems for detecting a steering wheel angle instability in an auto-guided vehicle.

Figure 3:
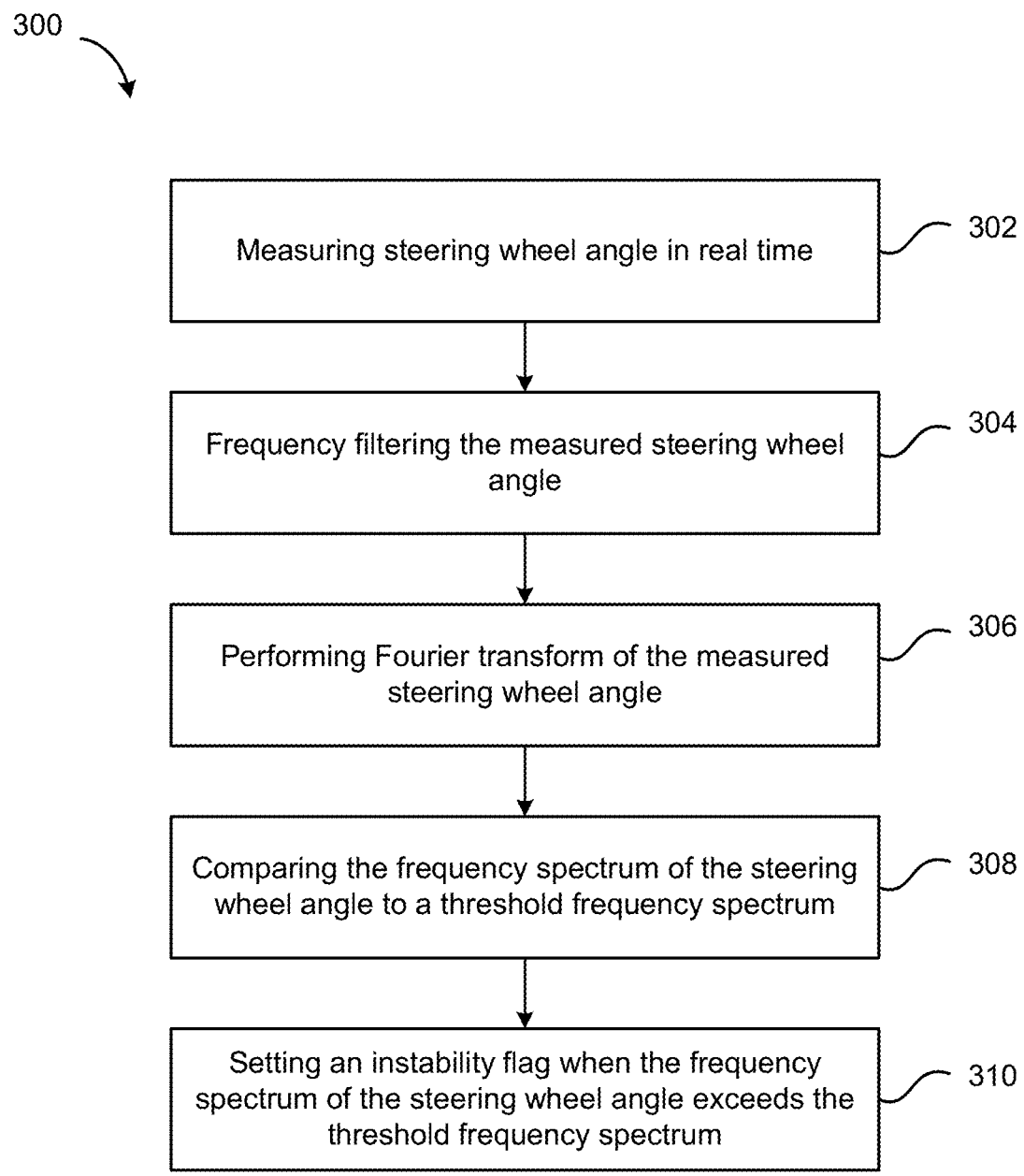
FIG. 3 is a simplified flowchart illustrating a method of detecting a steering wheel angle instability in an auto-guided vehicle according to some embodiments of the present invention.

FIG. 3 is a simplified flowchart illustrating a method 300 of detecting a steering wheel angle instability in an auto-guided vehicle according to some embodiments of the present invention. The method 300 includes, at 302, measuring the steering wheel angles in real time. For example, the steering wheel angles may be measured at a plurality of regularly spaced time instances $t_0, t_1, t_2, \ldots t_n$ within a certain time window Δt to obtain an array of values of the steering wheel angle a(0), a(1), a(2), . . . a(n). The array of values of the steering wheel angles may be stored in a buffer for further processing as discussed below. Exemplary sizes of the time window Δt may range from 1 second to 30 seconds. Other sizes of the time window Δt are also possible.

At 304, the measured steering wheel angle values may be filtered using one or more frequency filters. For example, a high-pass filter (HPF) may be used for removing any bias or offset, as well as removing very low frequency components. Exemplary cutoff frequencies may range from 0 Hz to 2 Hz. As another example, in cases where the commanded steering angles follow a sinusoidal curve as a function of time (e.g., as illustrated in FIG. 2), a notch filter may be used for filtering out the commanded steering wheel angle frequency. Exemplary bandwidths of a notch filter may range from 0 Hz to 5 Hz.

In a further example, a low-pass filter (LPF) may be used for removing any noise above a certain frequency. Exemplary cutoff frequencies for a low-pass filter may range from 5 Hz to 25 Hz. In some cases, a band-pass filter (BPF) may be used for filtering out any frequencies outside a desired bandwidth.

In various embodiments, none, one or more frequency filters may be used. When no frequency filter is used, the frequency filtering step 304 is omitted. When two or more frequency filters are used, they may be combined in various ways. For example, a low-pass filter may be combined with a notch filter. Alternatively, a low-pass filter may be combined with a high-pass filter and a notch filter. Many variations are possible.

Figure 4:
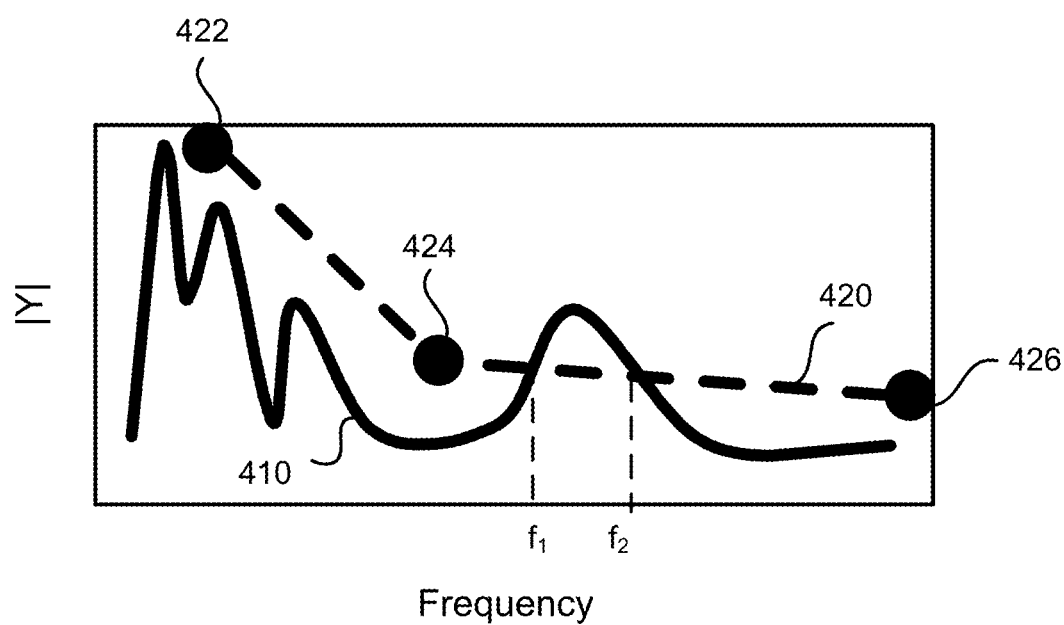
FIG. 4 illustrates schematically an exemplary frequency spectrum of measured steering angles (solid line), as compared to an exemplary threshold frequency spectrum (dashed line), according to some embodiments of the present invention.

At 306, a Fourier transform is performed on the array of values of the steering wheel angle a(0), a(1), a(2), . . . a(n) stored in the buffer. A Fourier transform converts the signals in the time domain to a representation in the frequency domain. Thus, the Fourier transform may produce a frequency spectrum of the steering wheel angles. FIG. 4 illustrates schematically an exemplary frequency spectrum 410, where the magnitude |Y| is plotted as a function of frequency. In some embodiments, the Fourier transform may be performed using a fast Fourier transform (FFT) algorithm.

At 308, the frequency spectrum of the steering wheel angles is compared to a pre-defined threshold frequency spectrum. An exemplary threshold frequency spectrum 420 is illustrated in FIG. 4. In this example, the threshold frequency spectrum 420 (the dashed line) is defined by two straight line segments. The first straight line segment may be defined by a starting point 422 and a middle point 424. The starting point 422 may be represented by a starting frequency and a starting magnitude. In some cases, the starting frequency may be zero. The middle point 424 may be represented by a middle frequency and a middle magnitude. The second straight line segment may be defined by the middle point 424 and an end point 426. The end point 426 may be defined by an end frequency and an end magnitude. In some cases, the end frequency may be infinity. In some other embodiments, the threshold frequency spectrum 420 may have other forms different from the two straight line segments. In general, the threshold frequency spectrum 420 may have higher magnitudes at lower frequencies than at higher frequencies, as frequency spectra of the steering wheel angle tend to have higher magnitudes at lower frequencies.

At 310, an instability flag is set if it is determined that a magnitude of the frequency spectrum of the steering wheel angles at one or more frequencies exceeds a magnitude of the pre-defined threshold frequency spectrum at the one or more frequencies. For instance, in the example illustrated in FIG. 4, in the frequency range between $f_1$ and $f_2$, the magnitudes of the frequency spectrum 410 exceed the magnitudes of the threshold frequency spectrum 420. Thus, it may be determined that a steering wheel angle instability is present.

It should be appreciated that the specific steps illustrated in FIG. 3 provide a particular method of detecting a steering wheel angle instability according to some embodiments of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5A:
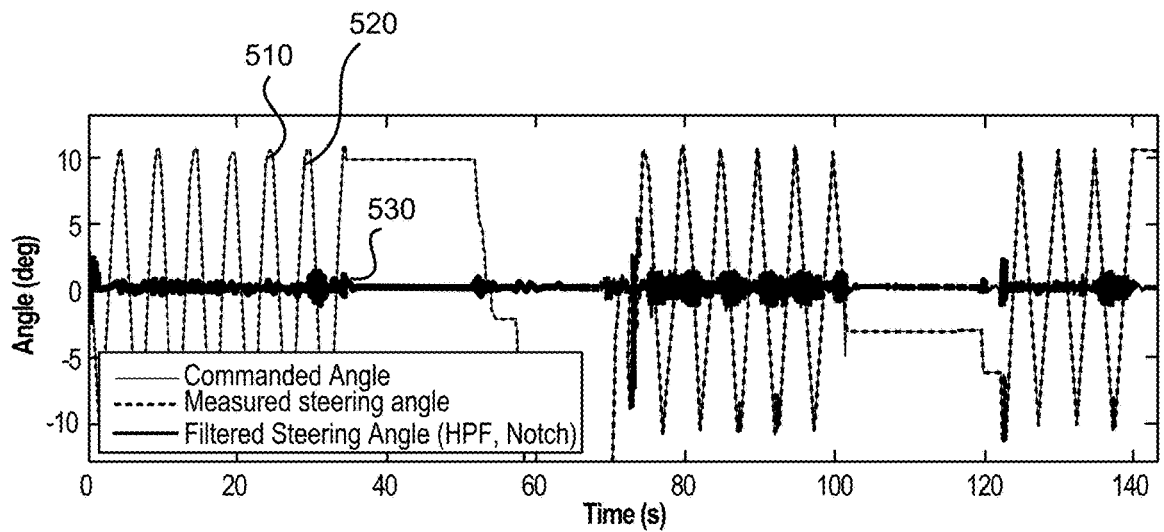
FIGS. 5A and 5B show a plot of commanded steering wheel angles as a function of time (solid line in FIG. 5A), a plot of measured steering wheel angles as a function of time (dashed line in FIG. 5A), and a plot of the filtered steering wheel angle data (thick solid lines in FIGS. 5A and 5B), according to some embodiments of the present invention.

FIG. 5A shows a plot of commanded steering wheel angles 510 as a function of time (solid line), and a plot of measured steering wheel angles 520 as a function of time (dashed line), obtained in a test according to some embodiments. The measured steering wheel angle data may be filtered using a high-pass filter (HPF) to remove any bias or offset as well as very low frequency components. The measured steering wheel angle data may be further filtered using a notch filter to remove the commanded steering wheel angle frequency. The filtered data is plotted as a function of time as the thick solid line 530 in FIGS. 5A and 5B.

Figure 5B:
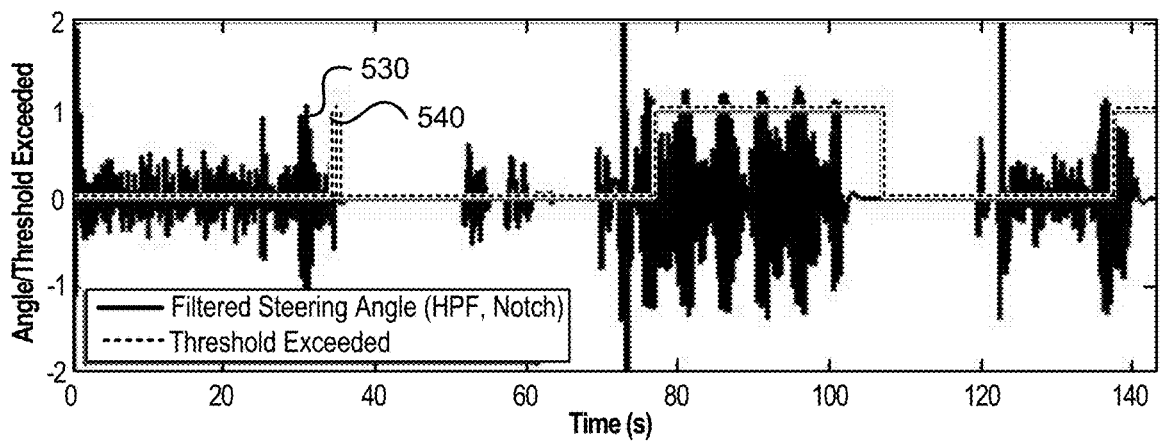
Figure 5C:
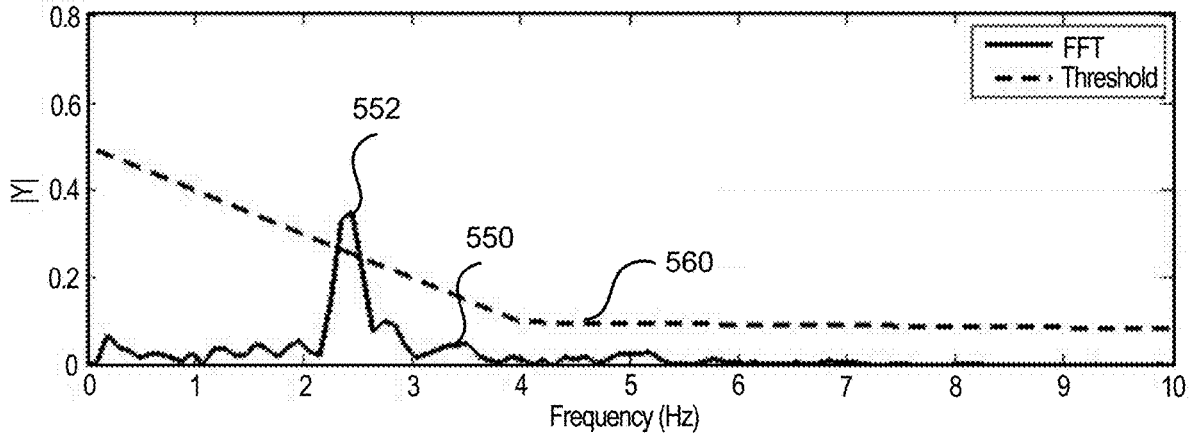
FIG. 5C shows a plot of a frequency spectrum of the steering wheel angles for a certain time window produced by a Fourier transform (solid line), as compared to a threshold frequency spectrum (dashed line), according to some embodiments of the present invention.
Figure 6:
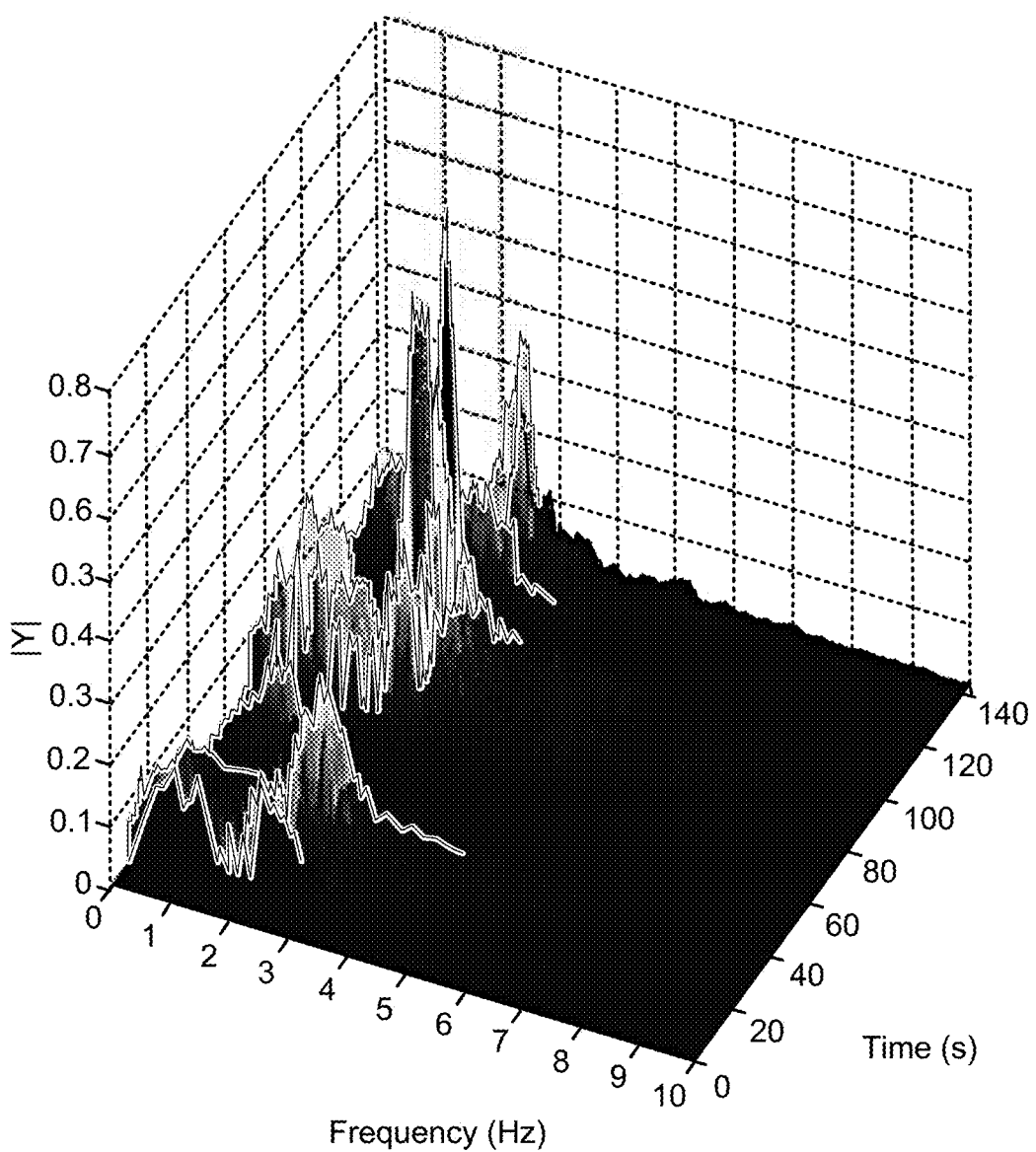
FIG. 6 shows some exemplary frequency spectra of the steering wheel angle over time according to some embodiments of the present invention.

Fourier transforms may be performed on the filter data. FIG. 5C shows a plot of the magnitude of a frequency spectrum of the steering wheel angles 550 (solid line) for a certain time window produced by a Fourier transform according to some embodiments. The magnitude of the frequency spectrum of the steering wheel angles 550 may be compared to a pre-defined threshold frequency spectrum 560 (dashed line) to determine whether an instability is present in that time window. In the example illustrated in FIG. 5C, the magnitude of the frequency spectrum of the steering wheel angles 550 exhibits a peak 552 that exceeds the threshold frequency spectrum 560. Therefore, an instability flag may be set for that time window. In FIG. 5B, the dotted line 540 indicates when an instability is detected, where the dotted line 540 has a value of 1 when an instability is detected and a value of zero otherwise. FIG. 6 shows some exemplary frequency spectra of the steering wheel angles over time according to some embodiments.

According to some embodiments, the method of detecting a steering wheel angle instability may be applied to servo tuning of an automatic steering system. The automatic steering system may include a control loop feedback mechanism for providing continuously modulated control based on measured errors. The control loop feedback mechanism may include one or more gains that need to be properly tuned in order to provide high precision control and good stability. For example, an automatic steering system may include a PID controller, in which one or more of a proportional gain (pGain), an integral gain (iGain), and a derivative gain (dGain) may need to be adjusted to optimum values for the desired control response.

Figure 7:
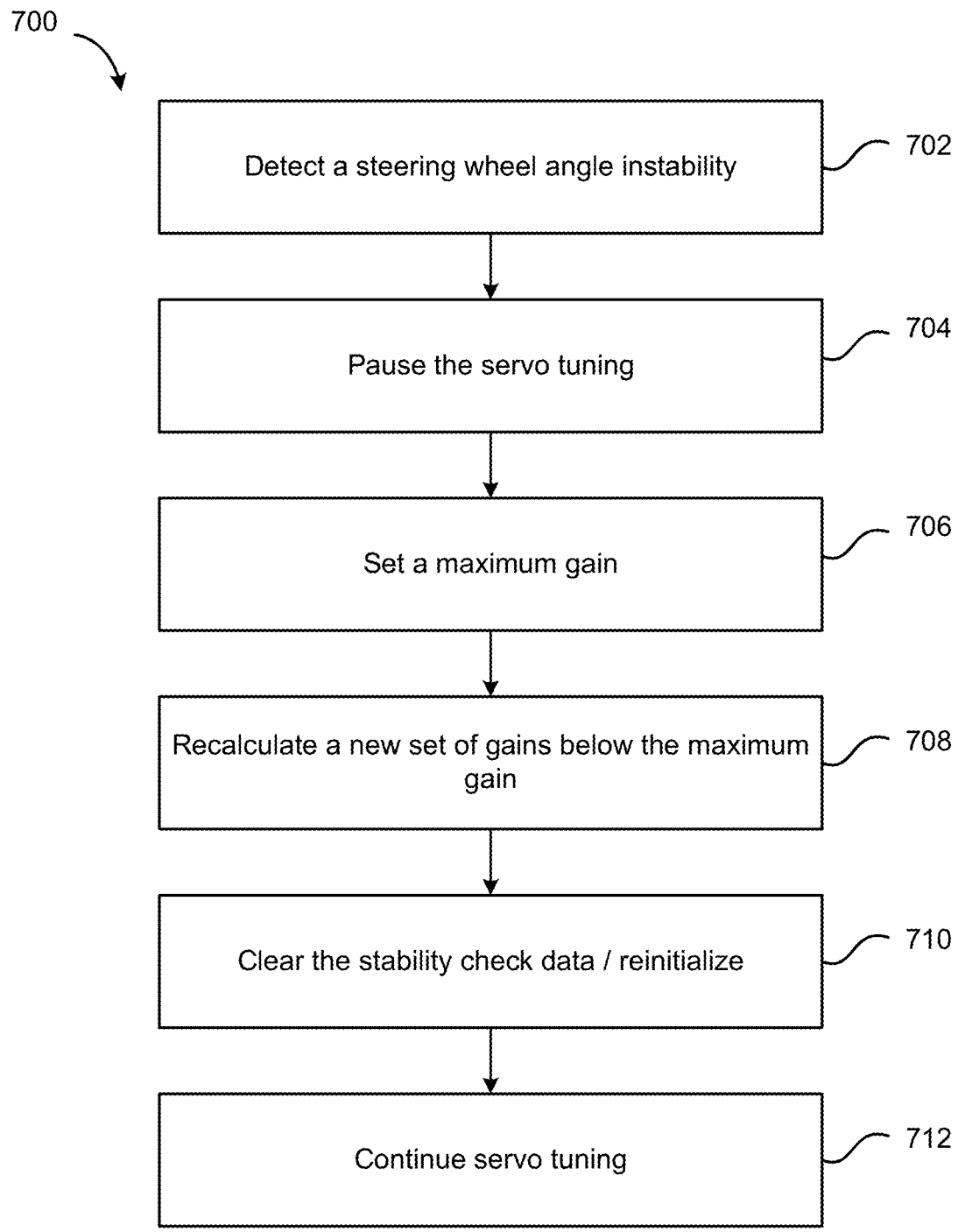
FIG. 7 is a simplified flowchart illustrating a method of servo tuning of an automatic steering system according to some embodiments of the present invention.

FIG. 7 is a simplified flowchart illustrating a method 700 of servo tuning of an automatic steering system according to some embodiments of the present invention. At 702, a steering wheel angle instability may be detected. For example, a gain of the automatic steering system (e.g., a proportional gain or pGain) may be set to an initial value, and the steering wheel angle is monitored in real time. The measured steering wheel angle may be processed and analyzed for detecting an instability according to the method described above in relation to FIG. 3. The gain may be gradually increased in each round of servo tuning until an instability is detected.

At 704, upon detecting an instability, the servo tuning may be paused. At 706, a maximum value of the gain may be set. For example, the maximum value may be set to a value slightly below the gain value where an instability is detected. At 708, a new set of values for the gain below the maximum value may be recalculated. At 710, the stability check data (e.g., the measured steering wheel angles stored in a buffer) may be cleared and reinitialized. At 712, the servo tuning is continued with the new set of values for the gain. In some embodiments, the servo tuning process may be performed manually by an operator. In such cases, the operator may be notified when an instability is detected, so that the operator may pause the servo tuning, recalculate the gains, and then resume servo tuning. In some other embodiments, the servo tuning process may be performed automatically by an auto-tuning system. In such case, when an instability is detected, the auto-tuning system may automatically reduce the gain.

It should be appreciated that the specific steps illustrated in FIG. 7 provide a particular method of servo tuning of an automatic steering system according to some embodiments of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

In some other embodiments, the method of detecting a steering wheel angle instability may be applied to normal driving of a vehicle (e.g., when a tractor is driven along a straight line guided by an automatic steering system).

Figure 8:
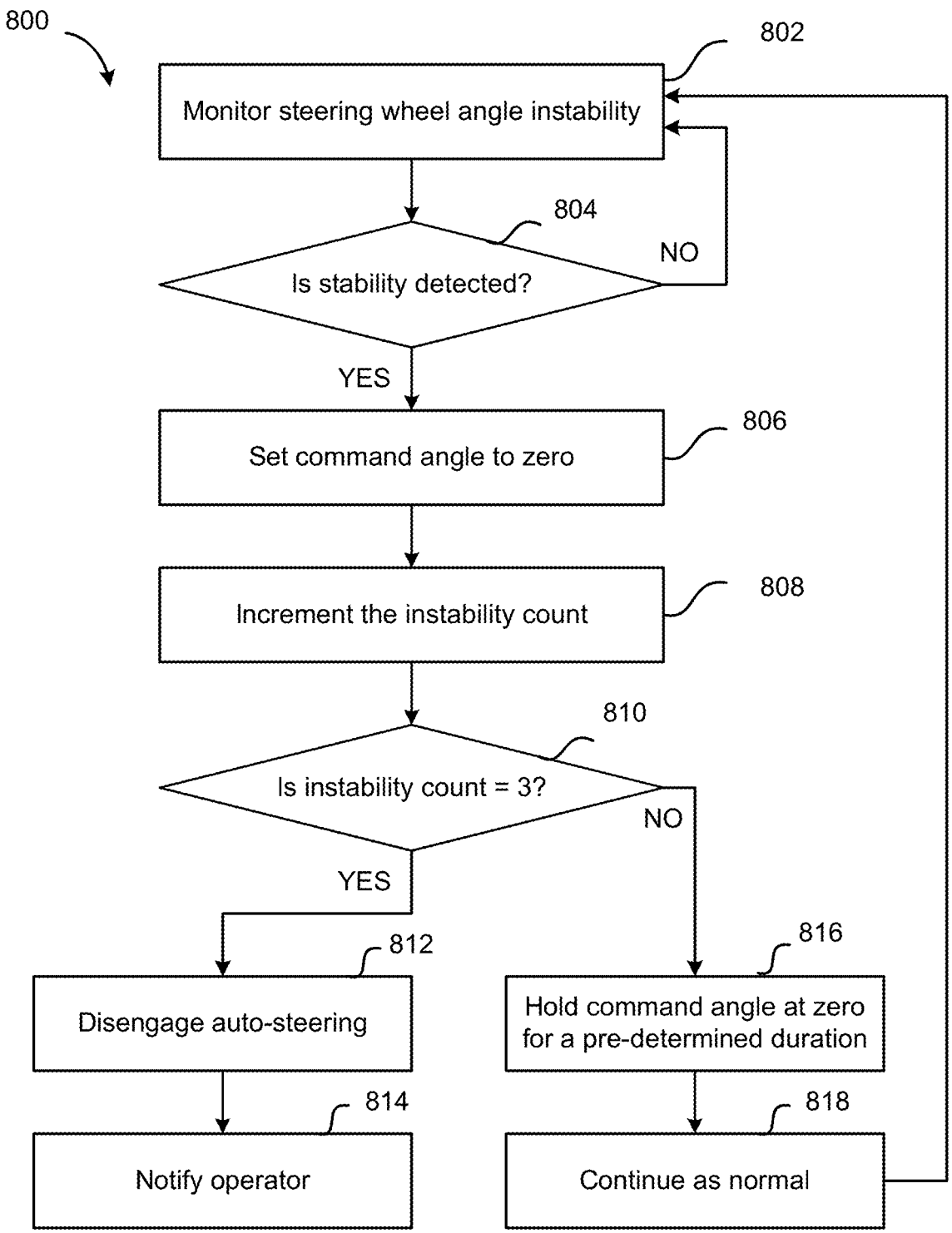
FIG. 8 is a simplified flowchart illustrating a method of monitoring steering wheel angle instability of a vehicle according to some embodiments of the present invention.

FIG. 8 is a simplified flowchart illustrating a method 800 of monitoring steering wheel angle instability of a vehicle according to some embodiments of the present invention. At 802, the steering wheel angle instability is monitored using the method described above in relation to FIG. 3. If, at 804, an instability is detected, at 806, the command angle may be set to zero to attempt to remove the instability; and at 808, the stability count is incremented. If, at 810, the instability count has reached a pre-determined number (e.g., 3), at 812, the automatic steering may be disengaged; and at 814, the operator may be notified of the instabilities, so the operator may investigate the problems. If, at 810, the stability count is less than three, at 816, the command angle may be held at zero for a pre-determined duration of time (e.g., 1 second, 5 seconds, and the like). At 818, normal driving is resumed with automatic steering, and the instability monitoring is resumed as well.

Figure 9:
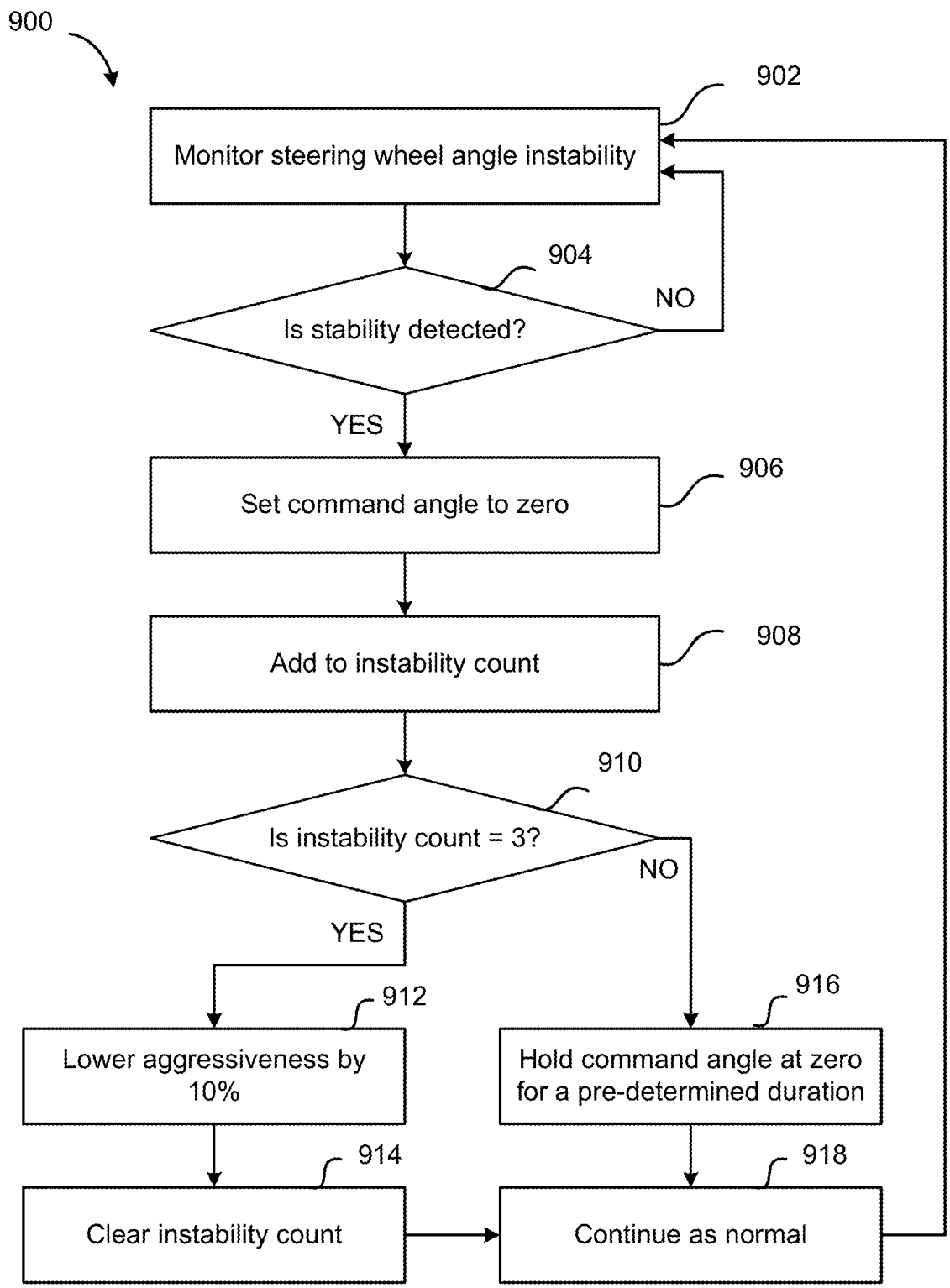
FIG. 9 is a simplified flowchart illustrating a method of monitoring steering wheel angle instability of a vehicle according to some other embodiments of the present invention.

FIG. 9 is a simplified flowchart illustrating a method 900 of monitoring steering wheel angle instability of a vehicle according to some other embodiments of the present invention. Steps 902, 904, 906, 908, 910, 916, and 918 are similar to steps 802, 804, 806, 808, 810, 816, and 818 of the method 800 illustrated in FIG. 8. But, here, when at 910 the instability count has reached the pre-determined number (e.g., 3), instead of disengaging automatic steering, the system may, at 912, lower aggressiveness of the automatic steering by a pre-determined percentage (e.g., 10%). For example, the system may lower a gain (e.g., the pGain) by 10%. At 914, the instability count is cleared. Then, at 918, normal driving is resumed.

It should be appreciated that the specific steps illustrated in each of FIGS. 8 and 9 provide particular methods of monitoring steering wheel angle instability of a vehicle according to embodiments of the present invention. Other sequences of steps may also be performed according to alternative embodiments. For example, alternative embodiments of the present invention may perform the steps outlined above in a different order. Moreover, the individual steps illustrated in each of FIGS. 8 and 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
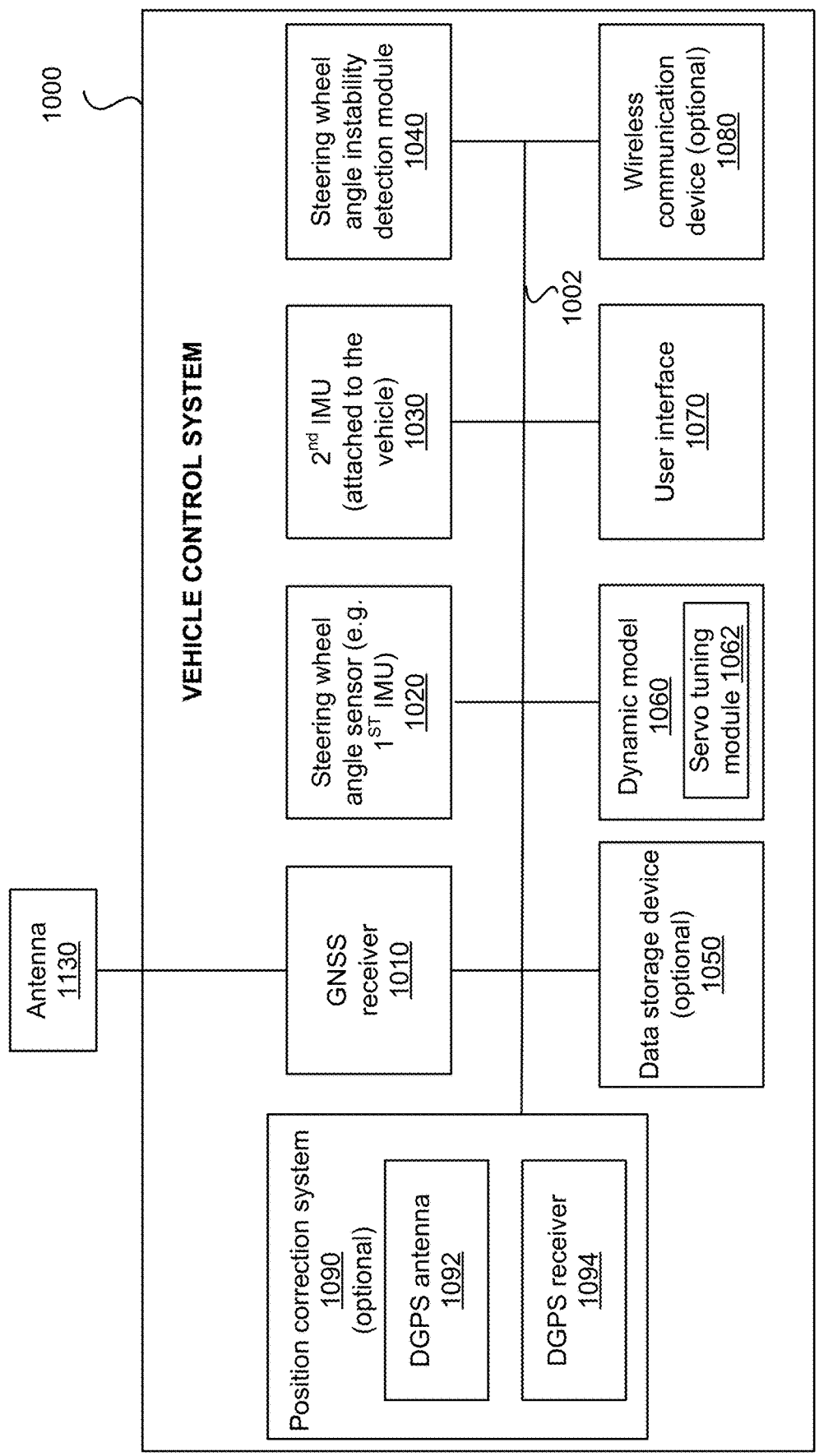
FIG. 10 shows a schematic block diagram of a vehicle control system according to some embodiments of the present invention.
Figure 11:
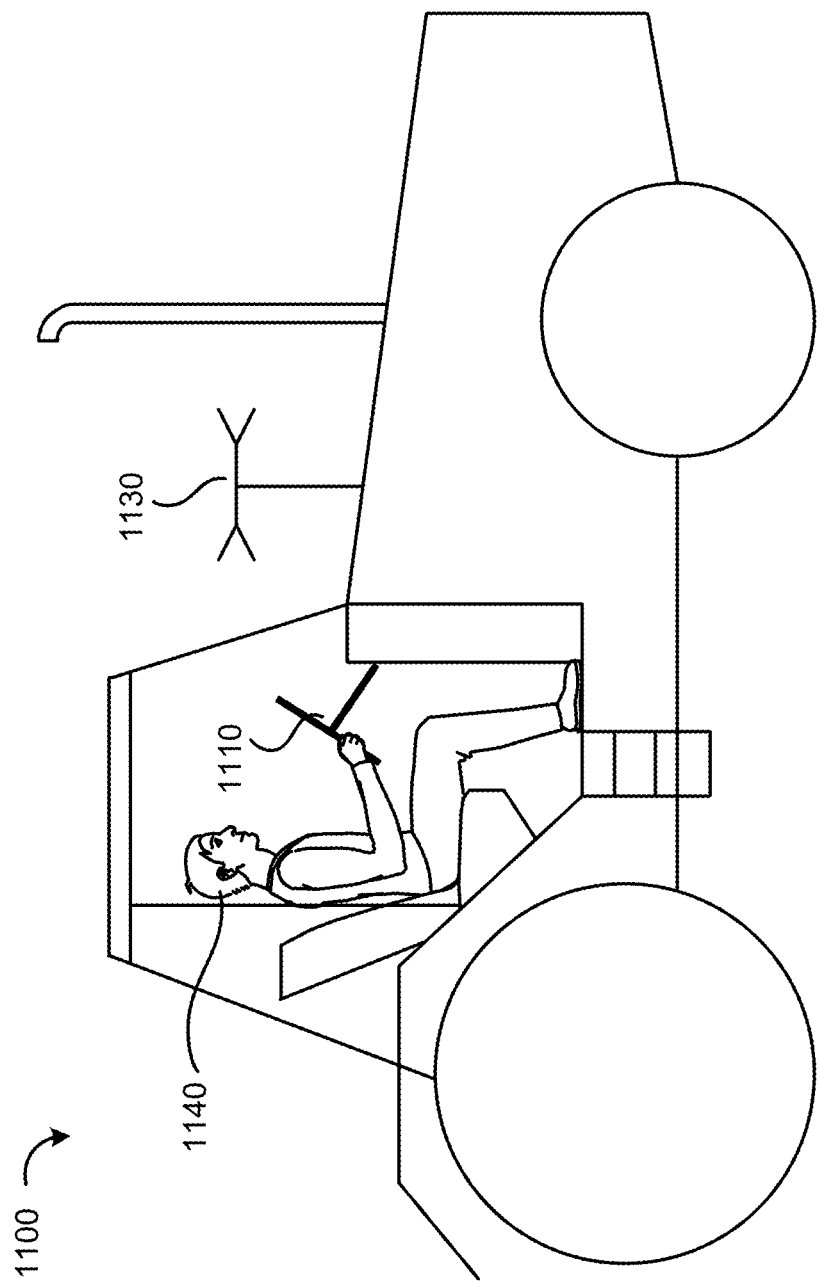
FIG. 11 illustrates a vehicle where the vehicle control system illustrated in FIG. 12 may be installed according to some embodiments of the present invention.

FIG. 10 shows a schematic block diagram of a vehicle control system 1000 according to some embodiments of the present invention. FIG. 11 illustrates a vehicle 1100 where the vehicle control system 1000 may be installed. The vehicle 1100 may include a steering wheel 1110 and a human operator 1140. The vehicle 1100 may also include an antenna 1130 for receiving satellite signals from global navigation satellite systems (GNSS). The antenna 1130 may be attached to a fixed part of the vehicle 1100, such as the roof or the body of the vehicle.

The vehicle control system 1000 may be implemented as an integrated guidance system that can be mounted on the dashboard, windshield, or ceiling of the vehicle 1100. In some embodiments, the vehicle control system 1000 may be integrated with a steering component, which may be coupled with the steering wheel 1110 (or a steering column or steering shaft) of the vehicle and is operable for actuating the steering mechanism thereof. In some other embodiments, the vehicle control system 1000 may be implemented as a plurality of discrete components which are communicatively coupled in a network.

The vehicle control system 1000 may facilitate controlling the steering of the vehicle 1100, thus allowing more precise control of the vehicle 1100 than may be realized by a human operator under certain conditions. For example, a snowplow may operate under conditions in which a human operator's ability to see the road is diminished. Additionally, when performing highly repetitive tasks such as plowing a field, the vehicle control system 1000 may afford more precise control of the vehicle, thus minimizing errors in controlling the vehicle which may result in gaps or overlaps in the field.

Referring to FIGS. 10 and 11, the vehicle control system 1000 may include a steering wheel angle sensor 1020 attached to the steering wheel 1110 of the vehicle 1100. In some embodiments, the steering wheel angle sensor 1020 may include a first inertial measurement unit (IMU) 1020 that includes a three-axis accelerometer and a three-axis gyroscope. The first IMU 1020 may be configured to detect linear accelerations of the steering wheel 1110, and rotational rates of the steering wheel 1110 in the pitch, roll, and yaw axis.

The vehicle control system 1000 may further include a second IMU 1030 attached to a fixed part of the vehicle 1100. For example, the second IMU 1030 may be attached to where the antenna 1130 is attached to, or to the front or the back of the vehicle 1100. The second IMU 1030 may include a three-axis accelerometer and a three-axis gyroscope, and configured to detect linear accelerations of the vehicle, and rotational rates of the vehicle 1100 in the pitch, roll, and yaw axis.

The vehicle control system 1000 may further include a GNSS receiver 1010 coupled to the antenna 1130. The GNSS receiver 1010 may be configured to determine a position of the vehicle 1100 based on the satellite signals received from GNSS satellites. In some embodiments, the vehicle control system 1000 may further include an optional position correction system 1090. The position correction system 1090 may include an antenna 1092 and a receiver 1094 for receiving correction data from a reference station or a network of reference stations. For example, the position correction system 1090 may include a differential global positioning system (DGPS). The correction data may be used by the GNSS receiver 1010 to determine a more precise position of the vehicle 1100 (e.g., to millimeter or submillimeter accuracies). In some other embodiments, the GNSS receiver 1010 may be an independent unit separate from the vehicle control system 1000. In some embodiments, the second IMU 1030 may reside inside the GNSS receiver 1010, as some GNSS receivers include a built-in IMU.

The vehicle control system 1000 may further include a data storage device 1050. For example, the data storage device 1050 may store one or more pre-planned paths, as well as measured steering wheel angles. The data storage device 1050 may also store computer-executable instructions or other information. The data storage device 1050 may comprise a volatile memory random access memory (RAM), or non-volatile data storage device such as a hard disk drive, flash memory or other optical or magnetic storage device.

The vehicle control system 1000 further includes a dynamic model 1060. The dynamic model 1060 may be configured to determine a current angle of the steering wheel 1110 relative to the vehicle 1100 based on the readings of the first IMU 1020, the readings of the second IMU 1030, and a previous estimated angle of the steering wheel 1110 relative to the vehicle 1100. For example, the gravity vector may be tracked based on the reading of the three-axis accelerometer of the first IMU 1020. A rate of rotation of the steering wheel 1110 in each of a roll axis, a pitch axis, and a yaw axis may be determined based on the readings of the three-axis gyroscope of the first IMU 1020 and the gravity vector. A rate of rotation of the vehicle 1100 in each of the roll axis, the pitch axis, and the yaw axis may be determined based on readings of the three-axis gyroscope of the second IMU 1030. The rate of rotation of the vehicle 1100 may be subtracted from the rate of rotation of the steering wheel 1110 to determine a rate of rotation of the steering wheel 1110 relative to the vehicle 1100. The current angle of the steering wheel 1110 can then be determined based on the previous estimated angle of the steering wheel 1110 and the rate of rotation of the steering wheel 1110 relative to the vehicle 1100.

The dynamic model 1060 may be configured to determine a current heading of the vehicle 1100 based on a previous estimated heading of the vehicle 1100 and the readings of the second IMU 1030. For example, a rate of rotation of the vehicle 1100 in the yaw axis may be determined based on the readings of the three-axis gyroscope of the second IMU 1030, which can be used to determine the current heading of the vehicle 1100.

The dynamic model 1060 may be configured to compare a current position of the vehicle 1100 as determined by the GNSS receiver 1010 to a pre-planned path stored in the storage device 1050, and determine whether the current position of the vehicle 1100 deviates from the pre-planned path and the amount of deviation if any. The dynamic model 1060 may be further configured to determine a current velocity of the vehicle 1100 based on readings of the accelerometers of the second IMU 1030. The velocity of the vehicle may include a ground speed and a yaw rate. Alternatively, the dynamic model 1060 may be configured to determine the current velocity of the vehicle 1100 based on GNSS signals received by the GNSS receiver 1010.

The dynamic model 1060 may be further configured to determine a desired angle of the steering wheel 1110 based on the current angle of the steering wheel 1110, the amount of deviation from the pre-planned path, the current heading of the vehicle 1100, and the current velocity of the vehicle 1100. The dynamic model 1060 may include, for example, a PID controller configured to continuously calculate an error value e(t) as the difference between a desired angle of the steering wheel 1110 and a measured steering wheel angle, and apply a correction based on proportional, integral, and derivative terms. The dynamic model 1060 may include a servo tuning module 1062 for adjusting the control parameters (e.g., proportional gain or pGain, integral gain or iGain, derivative gain or dGain) to the optimum values for the desired control response. The servo tuning module 1062 may be operated automatically or manually according to various embodiments.

The vehicle control system 1000 further includes a steering wheel angle instability detection module 1040. The steering wheel angle instability detection module 1040 may be configured to process the measured steering wheel angle values in real time to detect any steering wheel angle instabilities, as discussed above with references to FIGS. 3 and 4. The steering wheel angle instability detection module 1040 may be configured to measure steering wheel angles in real time using the steering wheel angle sensor 1020 (e.g., in conjunction with using the second IMU 1030). The steering wheel angle instability detection module 1040 may include a memory (e.g., a buffer) for storing the measured steering wheel angles. In some other embodiments, the measured steering wheel angles may be stored in the data storage device 1050. The steering wheel angle instability detection module 1040 may also include one or more frequency filters, such as a low-pass filter (LPF), a high-pass filter (HPF), a notch filter, and a band-pass filter (BPF), for filtering the measured steering wheel angles. The steering wheel angle instability detection module 1040 may further include a processor for performing Fourier transforms on the measured steering wheel angles to obtain frequency spectra of the steering wheel angle in real time. A pre-defined threshold frequency spectrum may be stored in the memory of the steering wheel angle instability detection module 1040 or in the data storage device 1050. The processor may be configured to compare the frequency spectra of the steering wheel angle with the pre-defined threshold frequency spectrum to determine whether a steering wheel angle instability is present.

In some embodiments, during an automatic servo-tuning procedure performed by the servo tuning module 1062, the steering wheel angle instability detection module 1040 may, in response to detecting a steering wheel angle instability, cause the servo tuning module 1062 to pause servo tuning and to automatically lower the value of a gain of the dynamic model 1060, as discussed above in relation to FIG. 7. In some other embodiments, during normal driving, the steering wheel angle instability detection module 1040 may, in response to detecting a steering wheel angle instability, cause the dynamic model 1060 to perform the methods illustrated in FIGS. 10 and 11 as discussed above.

The vehicle control system 1000 may further include a user interface 1070. The user interface 1070 may be configured to, for example, display a message notifying the operator 1140 that there is a steering wheel angle instability, so that the operator 1140 may further investigate the situation.

Although the various components of the vehicle control system 1000 are shown to be connected to each other via a bus 1002 in FIG. 10, this is not required. In some embodiments, the vehicle control system 1000 may include a wireless communication device 1080, using for example Bluetooth or Wi-Fi technologies. The dynamic model 1060 may be coupled to the GNSS receiver 1010, the first IMU 1020, and the second IMU 1030 wirelessly via the wireless communication device 1080.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of detecting steering wheel angle instability in an auto-guided vehicle, the method comprising:
    measuring a steering wheel angle at a plurality of time instances within a pre-determined time window to obtain an array of values of the steering wheel angle at the plurality of time instances, each respective value of the array of values corresponding to a respective time instance of the plurality of time instances;
    performing a frequency analysis of the array of values of the steering wheel angle to obtain a frequency spectrum of the steering wheel angle;
    comparing the frequency spectrum of the steering wheel angle to a pre-defined threshold frequency spectrum to determine whether a magnitude of the frequency spectrum of the steering wheel angle at any frequency exceeds a magnitude of the threshold frequency spectrum at a corresponding frequency; and
    upon determining that a magnitude of the frequency spectrum of the steering wheel angle at one or more frequencies exceeds a magnitude of the pre-defined threshold frequency spectrum at the one or more frequencies, determining that a steering wheel angle instability is present.

2. The method of claim 1 wherein the pre-defined threshold frequency spectrum is defined by one or more straight line segments.

3. The method of claim 2 wherein the one or more straight line segments include a first straight line segment defined by a starting magnitude at a starting frequency and a middle magnitude at a middle frequency, and a second straight line segment defined by the middle magnitude at the middle frequency and an end magnitude at an end frequency.

4. The method of claim 1 wherein the pre-defined threshold frequency spectrum comprises a continuous curve.

5. The method of claim 1 further comprising:
    before performing the frequency analysis, filtering the array of values of the steering wheel angle using at least one frequency filter.

6. The method of claim 5 wherein the at least one frequency filter comprises a high-pass filter.

7. The method of claim 6 wherein the at least one frequency filter further comprises a notch filter, a center frequency of the notch filter being at a commanded steering wheel angle frequency.

8. The method of claim 5 wherein the at least one frequency filter comprises a low-pass filter.

9. The method of claim 5 wherein the at least one frequency filter comprises a notch filter.

10. The method of claim 5 wherein the at least one frequency filter comprises a band-pass filter.

11. The method of claim 1 wherein the pre-determined time window ranges from about 1 second to about 20 seconds.

12. The method of claim 1 wherein the vehicle is configured to be auto-guided by an automatic steering system using a dynamic model including one or more gains, and wherein the steering wheel angle instability is detected during a servo tuning of the automatic steering system, the method further comprising, upon determining that the steering wheel angle instability is present:
pausing the servo tuning of the automatic steering system;
reducing a gain value of at least one of the one or more gains; and
resuming the servo tuning at the reduced gain value.

13. The method of claim 1 wherein the vehicle is auto-guided by an automatic steering system, the method further comprising, upon determining that the steering wheel angle instability is present:
incrementing an instability count; and
upon determining that the instability count is equal to a pre-determined value, disengaging auto-guidance of the vehicle by the automatic steering system.

14. A system for detecting steering wheel angle instability in an auto-guided vehicle, the system comprising:
a steering wheel angle sensor coupled to a steering wheel of the vehicle, the steering wheel angle sensor configured to measure a steering wheel angle at a plurality of time instances within a pre-determined time window to obtain an array of values of the steering wheel angle at the plurality of time instances, each respective value of the array of values corresponding to a respective time instance of the plurality of time instances;
a memory for storing the array of values of the steering wheel angle; and
a processor coupled to the memory, the processor configured to:
perform a frequency analysis of the array of values of the steering wheel angle to obtain a frequency spectrum of the steering wheel angle;
compare the frequency spectrum of the steering wheel angle to a pre-defined threshold frequency spectrum; and
set an instability flag upon determining that a magnitude of the frequency spectrum of the steering wheel angle at one or more frequencies exceeds a magnitude of the threshold frequency spectrum at the one or more frequencies.

15. The system of claim 14 further comprising:
at least one frequency filter coupled to the memory and configured to filter the array of values of the steering wheel angle before the processor performs the frequency analysis.

16. The system of claim 15 wherein the at least one frequency filter comprises a high-pass filter.

17. The system of claim 15 wherein the at least one frequency filter comprises a notch filter or a band-pass filter.

18. The system of claim 15 wherein the at least one frequency filter comprises a low-pass filter.

19. The system of claim 14 wherein the steering wheel angle sensor comprises a first inertial measurement unit (IMU) attached to the steering wheel, and a second IMU attached to a fixed part of the vehicle.

20. The system of claim 14 wherein the pre-defined threshold frequency spectrum is defined by a first straight line segment and a second straight line segment.

* * * * *